March 5, 1963  H. M. BROWN  3,080,445
FLAT DRY CELL AND BATTERY

Filed July 14, 1960  2 Sheets-Sheet 1

INVENTOR.
HOWARD M. BROWN
BY
*John F. Hofmann*
ATTORNEY

March 5, 1963  H. M. BROWN  3,080,445
FLAT DRY CELL AND BATTERY
Filed July 14, 1960  2 Sheets-Sheet 2

INVENTOR.
HOWARD M. BROWN
BY
John F. Hohmann
ATTORNEY

United States Patent Office 3,080,445
Patented Mar. 5, 1963

3,080,445
FLAT DRY CELL AND BATTERY
Howard M. Brown, Toronto, Ontario, Canada, assignor to Union Carbide Canada Limited, a corporation of Toronto, Ontario, Canada
Filed July 14, 1960, Ser. No. 42,928
3 Claims. (Cl. 136—111)

This invention relates to primary flat dry cells, the active cell elements of which are enclosed within a flexible, electrolyte impervious, plastic film wrapper, and more especially concerns the provision of improved means for making electrical intercell contact between such flat dry cells in a battery thereof.

A number of primary flat dry cells having plastic film wrappers enclosing the active elements of the cell are known in the art. Difficulty has been experienced with such flat dry cells in the provision of means for making intercell contact between cells when assembled into a battery. It has been proposed, for example, to provide these cells with a contactor element enclosed within the plastic film wrapper of the cells and having sharp projecting surfaces or barbs. These sharp projecting surfaces or barbs served to pierce the plastic film wrapper of an adjacent cell in battery and to electrically contact an electrode thereof. In order to keep the barbs in contact with the electrodes of the adjacent cells, tying tapes have ordinarily been applied to the ends of the battery stack of cells. As often happened, particularly when the battery stack contained only two or three cells such that it was difficult to maintain a high tying pressure, the typing tapes relaxed somewhat with time, the result of which in some instances was the loss of intercell contact achieved by the barbs.

It is therefore an object of the invention to provide an improved primary flat dry cell, the active cell elements of which are enclosed within a flexible, electrolyte impervious, plastic film wrapper.

More specifically, another object is to provide such a primary flat dry cell having improved means for making electrical intercell contact between cells in a battery thereof.

Another object is to provide such a primary flat dry cell having improved means for sealing the plastic film wrapper of the cell.

Still another object is to provide a battery of such primary flat dry cells.

According to the invention, a primary flat dry cell, the active elements of which are enclosed within a flexible, electrolyte impervious, plastic film wrapper, is provided with a metal conductor leading out from the cell, the outer end of which has a plurality of sharp projecting surfaces or barbs. The conductor during assembly of a battery is bent around the edge of the cell and positioned between cells in the battery. The barbs pierce the wrapper of the adjacent cell and make contact with an electrode thereof. The metal conductor has sufficient resilience to maintain the barbs in contact with the electrode of the adjacent cell in the event that the tying tapes, or other pressure device employed, relax after assembly of the battery.

Figure 1:
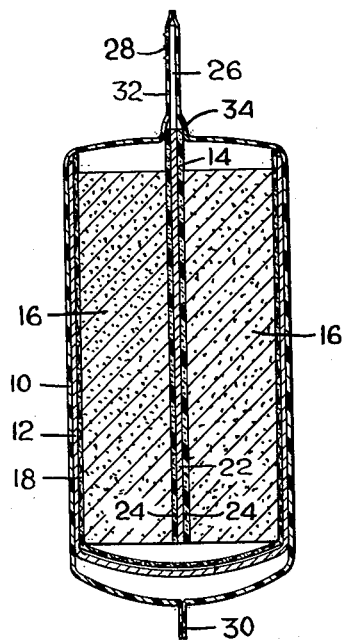
FIG. 1 is a sectional view of a primary flat dry cell embodying the invention, taken along the lines 1—1 of FIG. 2.

Referring to the drawings, a primary flat dry cell embodying the invention has a flexible, electrolyte impervious, no-conductive, plastic film wrapper 10 which completely encloses the active elements of the cell. Within the plastic film wrapper 10, there is provided a generally U-shaped consumable metal anode 12 having flat rectangular sides, the outer surfaces of which are adjacent to the inner wall of the plastic film wrapper 10. A cathode current collector 14 having depolarizer mix cakes 16, containing electrolyte, on each side thereof is disposed between the legs of the U-shaped metal anode 12. A bibulous separator 18 is provided between the anode 12 and the depolarizer mix cakes 16. The separator 18 may be a paste but preferably, as shown, is a film coated bibulous sheet, such as methylcellulose coated paper. The bibulous separator 18 blankets the depolarizer mix cakes 16, as shown at 20.

The cathode collector 14 consists of a thin, rectangular, metallic sheet or plate 22, each side of which has laminated thereto an electrically conductive, electrolyte impervious, film 24. The film 24 may comprise a plastic film base material, for instance polyethylene which has been made conductive by incorporating therein intimately dispersed particles of carbon or graphite. Preferably, the film 24 consists of a rubber film base material made conductive by the incorporation of carbon or graphite powders. Specifically, a film material having a composition of 77 percent by weight graphite and 23 percent by weight polyisobutylene rubber has been used with great success. The metallic sheet 22 preferably is made from a tin plated steel. The film 24 may be laminated to the metallic sheet 22 by heat sealing it thereto, but preferably a solvent adhesive is employed when the rubber film base material is used. The solvent adhesive, for example, may be a mixture of mineral spirits and isopropanol with a small amount of a polyamide added thereto. The film 24 is made slightly larger than the metallic sheet 22 and the edges of the film, which overlap, are sealed to themselves to completely enclose the metallic sheet 22.

According to the invention, a metal conductor 26 is provided and is affixed to the cathode collector 14 at one end, the other end of which leads out from the cell. The outer end of the conductor 26 is provided with sharp projecting surfaces or barbs 28, hereinafter referred to as "barbs." The conductor 26 may be attached to the cathode collector 14 as by soldering, welding, or crimping, but it has been found practical and convenient to make the conductor 26 integral with the metallic sheet 22 of the collector 14.

The electrolyte impervious, plastic film wrapper 10 may be constructed in any of several ways; for instance, as shown in the embodiment of FIG. 1, the wrapper 10 may be formed from two sheets of a plastic film material which are folded about the sides of the cell and marginally heat sealed together, as indicated at 30. The wrapper 10 may be made from a number of plastic film materials such as vinyl, nylon, pliofilm, polyesters and polyethylene.

The conductor 26 is enclosed, as shown, between a pair of overlapping segments 32 of the plastic film wrapper 10. The plastic film segments 32 extend beyond the conductor 26 and are heat sealed to themselves, enclosing the conductor 26 between them. The plastic film segments 32 insulate the conductor 26 and prevent its corrosion. In addition, they also serve to cover the barbs 28 during assembly of a battery and to prevent the barbs 28 from accidentally tearing the wrappers 10 of other cells.

Figure 2:
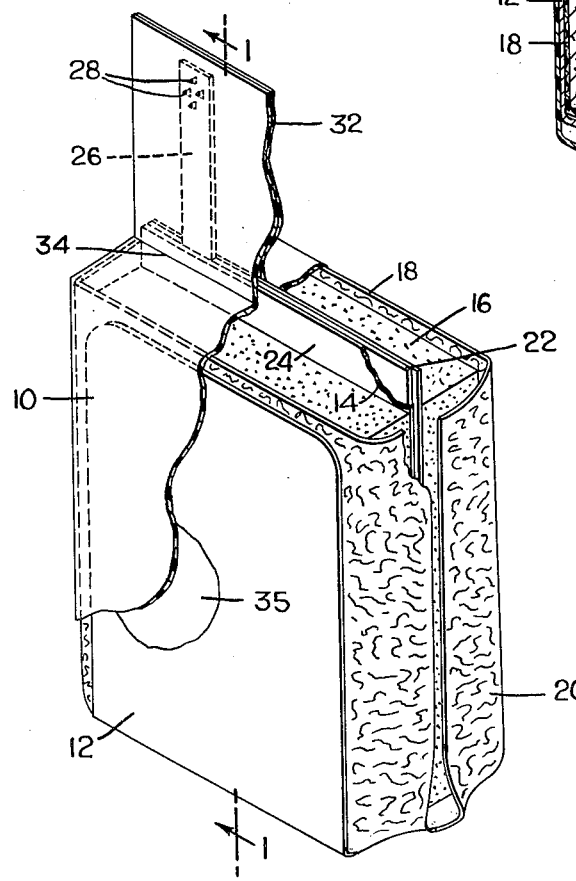
FIG. 2 is a perspective view of the primary flat dry cell shown in FIG. 1, the plastic film wrapper of the cell being partly broken away.

An important feature of the primary flat dry cell embodying the invention, referring particularly to FIG. 2, is that the wrapper 10 is sealed below the junction of the conductor 26 with the cathode collector 14. By this construction, it will be particularly noted that not only is an absolute seal against leakage provided but also the difficulty of sealing the wrapper 10 around the edges of the conductor 26 to prevent exudation therethrough is circumvented. As best shown in FIG. 2, the edge of the collector 14, to which the conductor 26 is affixed, is spaced somewhat beyond the depolarizer mix cakes 16 so that a portion of the conductive film 24 on both sides of the collector 14 is exposed. The plastic film wrapper 10 is then sealed, as indicated at 34, to the conductive film 24 on both sides of the collector 14. The wrapper 10 may be heat sealed to the collector 14 when the conductive film 24 on the collector 14 is plastic, but it is preferred that a solvent adhesive be used when the film consists of a rubber film base material.

A battery of primary flat dry cells embodying the invention may be quite simply constructed by stacking the cells together, bending over the conductor 26 of each cell to place it between cells in the stack and by applying an endwise pressure to the battery stack, as by tying tapes, so as to cause the barbs 28 on each conductor 26 to pierce the wrapper 10 of an adjacent cell and to contact the metal anode 12 thereof. The conductor 26 is made of a resilient metal, such as tin plated steel. When it is bent around the edge of cell, the conductor 26 is resiliently positioned between the cells in the battery stack and serves to keep the barbs 28 in contact with the anode 12 of the adjacent cell in the event that the tying tapes relax after assembly of the battery. The plastic film segments 32 of the wrapper 10, which enclose the conductor 26, prevent the edges of the conductor 26 from piercing the wrapper 10 of its own cell, thereby shorting it out, when the conductor 26 is placed between cells in the battery. It may be mentioned also that, if desired, a layer of wax or other sealing material 35 may be applied to the metal anode 12 at the point where the barbs 28 pierce the cell wrapper 10 in order to prevent electrolyte from reaching the contacting barbs 28 and corroding them.

Figure 3:
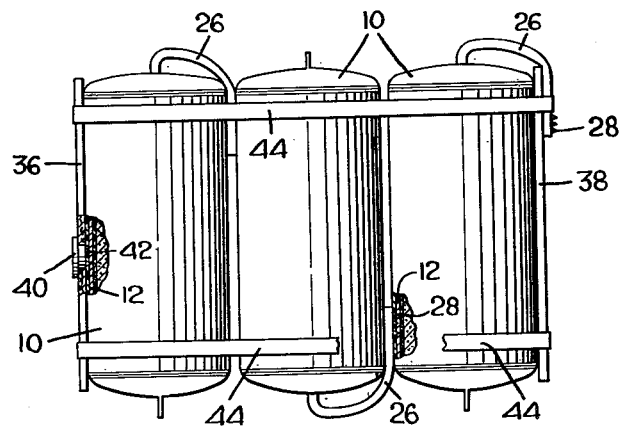
FIG. 3 is a view of a series connected battery of flat dry cells embodying the invention.

Referring to FIG. 3, a series connected battery of primary flat dry cells embodying the invention is illustrated. As there shown, the desired number of cells are stacked together by placing them side by side while alternating the position of the conductors 26, as shown, in order to keep the stack of cells straight. The conductor 26 of each cell is bent around the edge of the cell and positioned between cells in the stack so that the barbs 28 pierce the wrapper of adjacent cells and make contact with the metal anode 12 thereof. At each end of the stack, there is provided a non-conductive end board 36, 38, such as fiber board. One of these end boards 36 has a rivet terminal 40 placed through it, the inner side of which has a plurality of barbs 42, similar to the barbs 28 at the ends of each conductor 26. The barbs 42 make contact with the metal anode 12 of the cell adjacent to the end board 36. At the other end of the stack, the conductor 26 of the cell adjacent to the end board 38 is bent around the outside of the end board 38 and positioned as shown. The battery stack is then placed under an endwise pressure by tying the stack with tapes 44, such as fiberglass reinforced paper tapes. The battery stack may, if desired, be dipped in a microcrystalline wax and then placed within a suitable container, not shown.

Figure 4:
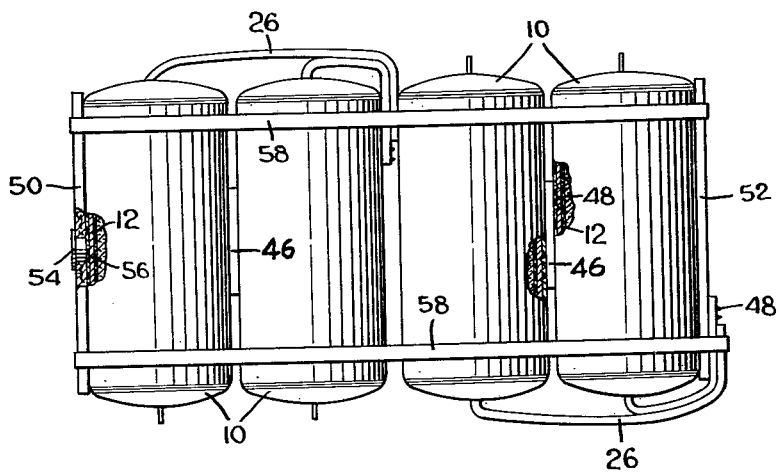
FIG. 4 is a view of a series-parallel connected battery of flat dry cells embodying the invention.
Figure 5:
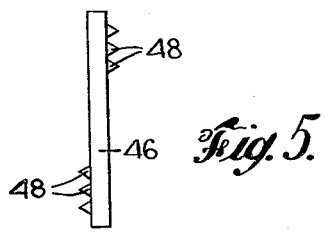
FIG. 5 is a side elevational view of an intercell contactor employed in the battery shown in FIG. 4.

A series-parallel connected battery of primary flat dry cells embodying the invention is shown in FIG. 4. As there shown, four cells are stacked together side by side in two series connected groups consisting of two cells connected in parallel. Between cells in each group, a metal intercell contactor 46 is employed and, as shown in FIG. 5, is provided with barbs 48 on both of its sides. The barbs 48 pierce the wrapper 10 of adjacent cells and make contact with the metal anode 12 of each cell. At each end of the stack, a non-conductive end board 50, 52 is provided. The end board 50 has a rivet-terminal 54 having a plurality of barbs 56 which make contact with the metal anode 12 of the cell adjacent to the end board 50. The conductors 26 of the parallel connected group of cells next adjacent to the end board 50 are placed between the two groups of cells to series connect them, the barbs 28 on the conductors 26 piercing the wrapper 10 of the adjacent cell to make contact with the anode 12 thereof. The conductors 26 of the other parallel connected group of cells is then placed around the outside of the endboard 52 and positioned as shown. The battery stack is then tied with tapes 58 and, if desired, coated with a microcrystalline wax before being placed within a suitable container.

A number of primary flat dry cells embodying the invention have been made as described herein and stacked into both series and series-parallel connected batteries. The batteries were tested over a period of time and proved successful with no occurrence of loss of intercell contact between cells due to relaxation of the tying tapes.

It will be understood that various changes and modifications of the primary flat dry cell embodying the invention and batteries thereof may be made without departing from the spirit and scope of the invention.

What is claimed is:

1. A battery comprising a stack of primary flat dry cells, each of which comprises a flexible plastic film wrapper containing a generally U-shaped consumable metal anode and a substantially flat cathode collector having depolarizer mix, containing electrolyte, on both sides thereof between the legs of said U-shaped metal anode, and a resilient conductor affixed to and extending outwardly from said cathode collector, said plastic film wrapper having overlapping film segments sealed together and completely enclosing said conductor, the outwardly extending portion of said conductor being positioned between adjacent cells in said stack and having thereon at least one sharp projecting surface making electrical contact with said U-shaped metal anode of an adjacent cell, the plastic film wrapper of which is pierced by said sharp projecting surface when pressure is applied to said stack when said battery is assembled.

2. A battery as defined by claim 1 wherein said cathode collector comprises a substantially flat metallic sheet having a conductive electrolyte impervious film laminated on both sides thereof and wherein said plastic film wrapper is sealed to said conductive film on both sides of said cathode collector.

3. A battery as defined by claim 2 wherein said conductive electrolyte impervious film is composed of a rubber film base material having incorporated therein a conductive material selected from the group of carbon and graphite.

References Cited in the file of this patent
UNITED STATES PATENTS

| | | |
|---|---|---|
| 2,632,783 | Coleman | Mar. 24, 1953 |
| 2,745,894 | Nowotny | May 15, 1956 |
| 2,798,895 | Nowotny | July 9, 1957 |
| 2,870,235 | Soltis | Jan. 20, 1959 |
| 2,880,259 | Nowotny | Mar. 31, 1959 |

UNITED STATES PATENT OFFICE
CERTIFICATE OF CORRECTION

Patent No. 3,080,445                                                     March 5, 1963

Howard M. Brown

It is hereby certified that error appears in the above numbered patent requiring correction and that the said Letters Patent should read as corrected below.

Column 1, line 25, for "in battery" read -- in a battery --; column 2, line 7, for "no-conductive" read -- non-conductive --; column 4, line 42, for "operlapping" read -- overlapping --.

Signed and sealed this 1st day of October 1963.

(SEAL)
Attest:

ERNEST W. SWIDER                                    DAVID L. LADD

Attesting Officer                                         Commissioner of Patents